United States Patent
Yu et al.

(10) Patent No.: US 11,984,596 B2
(45) Date of Patent: May 14, 2024

(54) ROD-SHAPED SODIUM ION POSITIVE ELECTRODE MATERIAL, PREPARATION METHOD THEREFOR AND APPLICATION THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yingsheng Zhong, Guangdong (CN); Aixia Li, Guangdong (CN); Yinghao Xie, Guangdong (CN); Changdong Li, Guangdong (CN); Bo Lin, Guangdong (CN)

(73) Assignees: GUANGDONG BRUNP RECYCLING TECHNOLOGY CO., LTD, Guangdong (CN); HUNAN BRUNP RECYCLING TECHNOLOGY CO., LTD., Hunan (CN); HUNAN BRUNP EV RECYCLING CO, LTD., Hunan (CN)

( * ) Notice: Subject to any disclaimer, the term of this patent is extended or adjusted under 35 U.S.C. 154(b) by 0 days.

(21) Appl. No.: 18/555,007

(22) PCT Filed: Aug. 30, 2022

(86) PCT No.: PCT/CN2022/115954
§ 371 (c)(1),
(2) Date: Oct. 12, 2023

(87) PCT Pub. No.: WO2023/093181
PCT Pub. Date: Jun. 1, 2023

(65) Prior Publication Data
US 2024/0088387 A1    Mar. 14, 2024

(30) Foreign Application Priority Data

Nov. 26, 2021    (CN) .................. 202111422025.7

(51) Int. Cl.
*H01M 4/58*      (2010.01)
*C01B 25/45*     (2006.01)
(Continued)

(52) U.S. Cl.
CPC .......... *H01M 4/5825* (2013.01); *C01B 25/45* (2013.01); *H01M 4/364* (2013.01);
(Continued)

(58) Field of Classification Search
CPC .............. H01M 4/364; H01M 4/5825; H01M 2004/028
See application file for complete search history.

(56) References Cited

U.S. PATENT DOCUMENTS

2016/0156019 A1*   6/2016   Kang .................... H01M 4/587
                                             264/465

FOREIGN PATENT DOCUMENTS

CN        102013475 A     4/2011
CN        105609778 A     5/2016
(Continued)

OTHER PUBLICATIONS

International Search Report for PCT/CN2022/115954 dated Nov. 17, 2022, ISA/CN.
(Continued)

*Primary Examiner* — Khanh T Nguyen
(74) *Attorney, Agent, or Firm* — Yue (Robert) Xu; Apex Attorneys at Law, LLP

(57) ABSTRACT

Disclosed are a rod-shaped sodium ion positive electrode material, a preparation method therefor and an application thereof. The material comprises a rod-shaped base material
(Continued)

and nanofibers inserted into the base material. C—Na is loaded on the nanofibers. The chemical general formula of the rod-shaped sodium ion positive electrode material is $Na(Fe_aT_b)PO_4/CNF\text{-}c(C\text{—}Na)$, and $0.001 \leq c \leq 0.1$, wherein T is at least one of Ni, Co, Zn, Mn, Fe, V, Ti or Mo, $0.9 \leq a < 1$, $0 < b \leq 0.2$, and $0.001 \leq c \leq 0.1$. In the present invention, on one hand, some transition metal elements are doped to improve the electrochemical performance thereof, and on the other hand, a modulator is added to synthesize the rod-shaped sodium ion positive electrode material, and the C—Na loaded nanofibers are added to adjust the proportion of large and small rod-shaped materials, so that the composition of a single $Na(Fe_aT_b)PO_4$ rod-shaped nanostructure is optimized.

10 Claims, 1 Drawing Sheet

(51) Int. Cl.
*H01M 4/36* (2006.01)
*H01M 4/02* (2006.01)
*H01M 10/054* (2010.01)

(52) U.S. Cl.
CPC ...... *C01P 2002/52* (2013.01); *C01P 2002/54* (2013.01); *C01P 2004/03* (2013.01); *C01P 2006/12* (2013.01); *C01P 2006/40* (2013.01); *H01M 2004/021* (2013.01); *H01M 2004/028* (2013.01); *H01M 10/054* (2013.01)

(56) References Cited

FOREIGN PATENT DOCUMENTS

| | | |
|---|---|---|
| CN | 108751158 A | 11/2018 |
| CN | 113526483 A | 10/2021 |
| CN | 114249312 A | 3/2022 |
| JP | 2011204638 A | 10/2011 |

OTHER PUBLICATIONS

Zhe Guo et al. "Effect of Zn-doping on the Electrochemical Performance of NaFePO4/C Cathode Material for Lithium Ion Battery" International Journal of Electrochemical Science, May 31, 2021.

* cited by examiner

ROD-SHAPED SODIUM ION POSITIVE ELECTRODE MATERIAL, PREPARATION METHOD THEREFOR AND APPLICATION THEREOF

This application is the national phase of International Application No. PCT/CN2022/115954, titled "ROD-SHAPED SODIUM ION POSITIVE ELECTRODE MATERIAL, PREPARATION METHOD THEREFOR AND APPLICATION THEREOF", filed on Aug. 30, 2022, which claims the priority to Chinese Patent Application No. 202111422025.7, titled "ROD-SHAPED SODIUM ION POSITIVE ELECTRODE MATERIAL, PREPARATION METHOD THEREFOR AND APPLICATION THEREOF", filed on Nov. 26, 2021 with the China National Intellectual Property Administration, which are incorporated herein by reference in entirety.

FIELD

The present disclosure belongs to the technical field of sodium-ion batteries, and specifically relates to a rod-shaped sodium-ion positive electrode material and a preparation method and application thereof.

BACKGROUND

Lithium-ion batteries (LIBs) offer high energy densities, but sodium-ion batteries (SIBs) are one of the most promising options for expanding the rechargeable battery category. At present, the main method to improve the performance of SIBs is doping with elements such as zinc, manganese, and iron, the main purpose of which is to reduce the cost and supply risk, and to regulate the performance of positive and negative materials.

The positive electrode materials for SIBs can be classified into four main types according to their structures, namely polyanionic compounds, conversion materials, layered oxides, and sodium-rich materials. Among them, $NaFePO_4$ sodium-ion battery positive electrode material is the most promising candidate material among polyanion compounds, which can meet many application requirements due to its good thermal stability and common raw materials. However, the material's poor charge-discharge cycle performance and low sodium diffusivity result in low electrical conductivity and low capacity retention, limiting its further development.

There are many methods to solve the above problems, including material structure change, morphology change, doping and coating. Among these methods, doping and morphology change have been shown to be effective and versatile improvement methods. The morphology change can not only improve the conductivity but also simulate the growth process during synthesis, and the doping itself can improve the conductivity of the positive electrode material.

SUMMARY

The present disclosure aims to solve at least one of the above-mentioned technical problems existing in the prior art. To this end, the present disclosure proposes a rod-shaped sodium-ion positive electrode material and a preparation method and application thereof. The present disclosure, on the one hand, adopts doping part of element to improve the electrochemical performance; and on the other hand, changes the material morphology by adding a regulator to synthesize the rod-shaped sodium-ion positive electrode material and adding C—Na-loaded nanofiber to adjust the ratio of large and small rod-shaped materials and optimizes the composition of rod-shaped nanostructure. Through the above two improvement measures, the problems of low cycle performance, low energy density and low conductivity can be solved.

According to one aspect of the present disclosure, a rod-shaped sodium-ion positive electrode material is proposed, comprising a rod-shaped base material and nanofiber interspersed in the base material, the nanofiber is loaded with C—Na, and the rod-shaped sodium-ion positive electrode material has a general chemical formula of $Na(Fe_aT_b)PO_4/CNF-cC-Na$, wherein T is at least one of Ni, Co, Zn, Mn, Fe, V, Ti and Mo, $0.9 \le a < 1$, $0 < b \le 0.2$, $0.001 \le c \le 0.1$.

In some embodiments of the present disclosure, a mass ratio of the base material to the nanofiber is 20:(0.02-1); a cross-sectional diameter ratio of the nanofiber to the base material is 1:(0.5-5). Further preferably, a cross-sectional diameter of the nanofiber is larger than a cross-sectional diameter of the base material. A cross-sectional diameter ratio of the nanofiber to the base material is 1:(0.5-1).

In some embodiments of the present disclosure, a loading of the C—Na is 0.1-10% of a mass of the nanofiber.

The present disclosure also provides a preparation method of the rod-shaped sodium-ion positive electrode material, comprising steps of:

S1: mixing phosphoric acid source, iron source, sodium source, T source, a regulator and C—Na-loaded nanofiber dispersion, and drying under an inert atmosphere to obtain a material to be sintered; and S2: first sintering the material to be sintered at a low temperature under an inert atmosphere to decompose the regulator to obtain a primary calcined powder, and washing, drying, ball-milling, and then sintering the primary calcined powder at a high temperature to obtain the rod-shaped sodium-ion positive electrode material.

In some embodiments of the present disclosure, in step S1, the phosphoric acid source is at least one of ammonium phosphate, ammonium hydrogen phosphate, phosphoric acid, sodium phosphate and sodium hydrogen phosphate.

In some embodiments of the present disclosure, in step S1, the iron source is at least one of ferrous sulfate, ferrous nitrate, ferrous chloride and ferrous bromide.

In some embodiments of the present disclosure, in step S1, the sodium source is at least one of sodium hydroxide, sodium carbonate, sodium chloride, sodium nitrate and sodium sulfate.

In some embodiments of the present disclosure, in step S1, the T source is at least one of soluble salts of Ni, Co, Zn, Mn, Fe, V, Ti and Mo.

In some embodiments of the present disclosure, in step S1, the regulator is at least one of dodecyltrimethylammonium chloride, dodecyltrimethylammonium bromide, tetradecyltrimethylammonium chloride, tetradecyltrimethylammonium bromide, cetyltrimethylammonium chloride, cetyltrimethylammonium bromide, octadecyltrimethylammonium chloride and octadecyltrimethylammonium bromide.

In some embodiments of the present disclosure, in step S1, a molar ratio of phosphate in the phosphoric acid source, iron element in the iron source, sodium element in the sodium source and T element in the T source is (0.9-1.2):(0.8-1.1):(0.9-1):(0.001-0.2).

In some embodiments of the present disclosure, in step S1, an added mass of the regulator is 0.5-8% of a total mass of the phosphoric acid source, iron source, sodium source and T source.

In some embodiments of the present disclosure, in step S1, the C—Na-loaded nanofiber dispersion is prepared as follows: soaking nanofiber paper in a mixed solution of acid and sodium salt, performing sensitization treatment, then washing the nanofiber paper, and peeling off to obtain nanofiber; mixing the nanofiber with organic sodium salt, ball-milling, heating under an inert atmosphere, and performing loading treatment to obtain C—Na-loaded nanofiber; and then dispersing the C—Na-loaded nanofiber in an ethylene glycol solution to obtain the C—Na-loaded nanofiber dispersion.

In some preferred embodiments of the present disclosure, the nanofiber paper is at least one of polyimide nanofiber paper, polypropylene nanofiber paper, silicon carbide nanofiber paper, carbon nanofiber paper and carbon-metal nanofiber paper.

In some preferred embodiments of the present disclosure, a solid-liquid ratio of the C—Na-loaded nanofiber to the ethylene glycol solution is (0.1-5):(1-20) (w/v).

In some preferred embodiments of the present disclosure, in the mixed solution of acid and sodium salt, a concentration of acid is 0.01-0.5 mol/L, and a concentration of sodium salt is 0.01-3 mol/L; a solid-liquid ratio of the nanofiber paper to the mixed solution of acid and sodium salt is (0.1-5):(1-2) (w/v).

In some preferred embodiments of the present disclosure, a mass ratio of the nanofiber to the organic sodium salt is 100:(0.1-10).

In some preferred embodiments of the present disclosure, a temperature of the heating is 400-900° C.

In some preferred embodiments of the present disclosure, the organic sodium salt is at least one of sodium formate, sodium citrate, sodium oxalate, sodium acetate, sodium benzoate, sodium tartrate and sodium malate.

In some preferred embodiments of the present disclosure, the peeling off is performed by scraping off nanofiber on the nanofiber paper in an ethanol solution with a scraper, and then drying.

In some embodiments of the present disclosure, in step S1, nanofiber in the nanofiber dispersion accounts for 0.01-5% of a total mass of the phosphoric acid source, iron source, sodium source, and T source.

In some embodiments of the present disclosure, in step S1, the specific steps of the mixing are as follows: first adding phosphoric acid source, iron source, sodium source and T source for a first stirring, then adding a regulator and adding acid to adjust pH, and then add C—Na-loaded nanofiber dispersion for a second stirring. Preferably, a duration of the first stirring is 1-5 h, and a duration of the second stirring is 2-10 h.

In some embodiments of the present disclosure, in step S1, a temperature of the drying is 80-120° C.

In some embodiments of the present disclosure, in step S1 and/or step S2, the inert atmosphere is one of He, Ne, Ar and Kr.

In some embodiments of the present disclosure, in step S2, a temperature of the sintering at low temperature is 100-300° C. Preferably, a duration of the sintering at low temperature is 3-8 h.

In some embodiments of the present disclosure, in step S2, a temperature of the sintering at high temperature is 300-800° C. Preferably, a duration of the sintering at high temperature is 4-12 h.

In some embodiments of the present disclosure, in step S2, a detergent used in the washing is a mixed solution of alcohol and acetic acid or sodium formate, and a solid-liquid ratio of the primary calcined powder to the detergent is 1:(0.5-10) (w/v).

The present disclosure also provides use of the rod-shaped sodium-ion positive electrode material in a sodium-ion battery.

According to a preferred embodiment of the present disclosure, it has at least the following beneficial effects:

1. The present disclosure, on the one hand, adopts doping part of transition metal element to improve the electrochemical performance; and on the other hand, adds a regulator to synthesize the rod-shaped sodium-ion positive electrode material, and adds C—Na-loaded nanofiber to adjust the ratio of large and small rod-shaped materials, which prevents a single structure from causing its single stability and electron transfer characteristics, and optimizes the composition a single $Na(Fe_aT_b)PO_4$ rod-shaped nanostructure, and the added nanofiber can relieve the stress and volume change during the intercalation and deintercalation of sodium ions. The composition of a variety of rod-shaped structures makes it have different types of rod-shaped materials, providing more channels and thus possibly providing different continuous electron and ion transport channels. In addition, the loading of C—Na on the nanofiber can supplement the amount of diffusible sodium ions, and the active sites for the reaction are greatly increased, which can better balance the problem of deintercalation of sodium ions, and help to improve the rate capability and cycle stability of the material.

2. In order to completely remove the regulator and reduce the damage to the sodium-ion positive electrode material, the regulator is decomposed as much as possible through first sintering at a low-temperature, and then the regulator is removed by washing with detergent and secondary sintering at high temperature. A two-step sintering method and washing treatment reduce the damage to the order and morphology of the material structure, and ensures the integrity and reliability of the structure.

BRIEF DESCRIPTION OF DRAWINGS

The present disclosure will be further described below in conjunction with the accompanying drawings and examples, in which.

DETAILED DESCRIPTION

The concept of the present disclosure and the technical effects produced thereby will be clearly and completely described below in conjunction with the examples, so as to fully understand the purpose, characteristics and effects of the present disclosure. Obviously, the described examples are only a part of the embodiments of the present disclosure, rather than all the embodiments. Based on the embodiments of the present disclosure, other embodiments obtained by those skilled in the art without creative efforts are all within the scope of protection of the present disclosure.

Example 1

Figure 1:
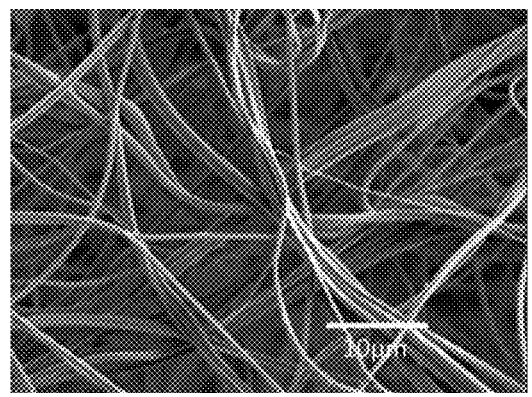
FIG. 1 shows the SEM images of nanofiber in Examples 1-6 of the present disclosure.

In this example, a rod-shaped sodium-ion positive electrode material is prepared, and the specific process is as follows:
(1) 120 mL of 0.53 mol/L ammonium dihydrogen phosphate, 91.4 mL of 0.52 mol/L ferrous chloride, 59.5 mL of 0.84 mol/L sodium acetate, and 3.4 mL of 0.74 mol/L nickel chloride were added to a beaker. During stirring in a stirrer for 1h43 min, 0.4 g of dodecyltrimethylammonium chloride was added, and acetic acid was added to control the pH to 7.1. After standing for 6h17 min, 12 mL of nanofiber dispersion loaded with 3.5% sodium citrate (The nanofiber fiber paper was carbon nanofiber paper, purchased from a material company in Zhejiang. The cross-sectional diameter of the nanofiber of the nanofiber paper was between 0.5-3 μm, as shown in FIG. 1; 5 g of nanofiber paper was soaked in 60 ml of a mixed solution of 0.04 mol/L hydrochloric acid and 0.23 mol/L sodium sulfate; and the mixture was stirred, and subjected to sensitization treatment. Then the nanofiber paper was washed and peeled off to obtain 3.7 g of nanofiber; and the nanofiber was mixed with 0.13 g of sodium citrate, ball-milled, sent to a sintering furnace under Ar atmosphere to heat at 530° C., and subjected to loading treatment to obtain C—Na-loaded nanofiber. Finally, the C—Na-loaded nanofiber was dispersed in 40 ml of ethylene glycol solution to obtain 3.5% C—Na-loaded nanofiber dispersion) was added, stirred in a stirrer for 6h16 min, sent to an oven with Ar gas added for anti-oxidation treatment, and dried at 80° C. for 4h7 min to obtain a material to be sintered;
(2) 5 g of the material to be sintered was put into a temperature-resistant ceramic crucible and sent to a sintering furnace filled with Ar gas for sintering at 185° C. for 2h7 min. The primary sintered black powder was taken out. Sodium acetate and alcohol were mixed at 1:1 to prepare a detergent. 6 mL of detergent and primary sintered black powder were mixed, stirred, washed for 3 times, separated, and sent to an oven for drying at 102° C. for 1h3 min. After ball-milling, they were sent to the sintering furnace again for sintering at 550° C. for 6h37 min. After ball-milling, 4.2 g of rod-shaped sodium-ion positive electrode material $Na(Fe_{0.95}Ni_{0.05})PO_4/CNF-0.035C-Na$ was obtained.

Example 2

In this example, a rod-shaped sodium-ion positive electrode material is prepared, and the specific process is as follows:
(1) 120 mL of 0.53 mol/L ammonium dihydrogen phosphate, 86.6 mL of 0.52 mol/L ferrous chloride, 59.5 mL of 0.84 mol/L sodium acetate, and 6.8 mL of 0.74 mol/L nickel chloride were added to a beaker. During stirring in a stirrer for 1h43 min, 0.5 g of dodecyltrimethylammonium chloride was added, and acetic acid was added to control the pH to 7.2. After standing for 6h17 min, 10 mL of nanofiber dispersion loaded with 3.5% sodium citrate (The nanofiber fiber paper was carbon nanofiber paper, purchased from a material company in Zhejiang. The cross-sectional diameter of the nanofiber of the nanofiber paper was between 0.5-3 μm; 5 g of nanofiber paper was soaked in 60 ml of a mixed solution of 0.04 mol/L hydrochloric acid and 0.23 mol/L sodium sulfate; and the mixture was stirred, and subjected to sensitization treatment. Then the nanofiber paper was washed and peeled off to obtain 3.7 g of nanofiber; and the nanofiber was mixed with 0.13 g of sodium citrate, ball-milled, sent to a sintering furnace under Ar atmosphere to heat at 530° C., and subjected to loading treatment to obtain C—Na-loaded nanofiber. Finally, the C—Na-loaded nanofiber was dispersed in 40 ml of ethylene glycol solution to obtain 3.5% C—Na-loaded nanofiber dispersion) was added, stirred in a stirrer for 6h16 min, sent to an oven with Ar gas added for anti-oxidation treatment, and dried at 80° C. for 4h7 min to obtain a material to be sintered;
(2) 5 g of the material to be sintered was put into a temperature-resistant ceramic crucible and sent to a sintering furnace filled with Ar gas for sintering at 185° C. for 2h7 min. The primary sintered black powder was taken out. Sodium acetate and alcohol were mixed at 1:1 to prepare a detergent. 6 mL of detergent and primary sintered black powder were mixed, stirred, washed for 3 times, separated, and sent to an oven for drying at 102° C. for 1h3 min. Then they were sent to the sintering furnace again for sintering at 550° C. for 6h37 min, and 4.3 g of rod-shaped sodium-ion positive electrode material $Na(Fe_{0.9}Ni_{0.1})PO_4/CNF-0.035C-Na$ was obtained.

Example 3

In this example, a rod-shaped sodium-ion positive electrode material is prepared, and the specific process is as follows:
(1) 120 mL of 0.53 mol/L ammonium dihydrogen phosphate, 94.3 mL of 0.52 mol/L ferrous chloride, 59.5 mL of 0.84 mol/L sodium acetate, and 1.8 mL of 0.55 mol/L zinc acetate were added to a beaker. During stirring in a stirrer for 1h43 min, 0.6 g of dodecyltrimethylammonium chloride was added, and acetic acid was added to control the pH to 6.8. After standing for 6h17 min, 15 mL of nanofiber dispersion loaded with 3.5% sodium citrate (The nanofiber fiber paper was carbon nanofiber paper, purchased from a material company in Zhejiang. The diameter of the nanofiber of the nanofiber paper was between 0.5-3 μm; 5 g of nanofiber paper was soaked in 60 ml of a mixed solution of 0.04 mol/L hydrochloric acid and 0.23 mol/L sodium sulfate; and the mixture was stirred, and subjected to sensitization treatment. Then the nanofiber paper was washed and peeled off to obtain 3.7 g of nanofiber; and the nanofiber was mixed with 0.13 g of sodium citrate, ball-milled, sent to a sintering furnace under Ar atmosphere to heat at 530° C., and subjected to loading treatment to obtain C—Na-loaded nanofiber. Finally, the C—Na-loaded nanofiber was dispersed in 40 ml of ethylene glycol solution to obtain 3.5% C—Na-loaded nanofiber dispersion) was added, stirred in a stirrer for 6h16 min, sent to an oven with Ar gas added for anti-oxidation treatment, and dried at 80° C. for 4h7 min to obtain a material to be sintered;
(2) 5 g of the material to be sintered was put into a temperature-resistant ceramic crucible and sent to a sintering furnace filled with Ar gas for sintering at 185° C. for 2h7 min. The primary sintered black powder was taken out. Sodium acetate and alcohol were mixed at 1:1 to prepare a detergent. 6 mL of detergent and primary sintered black powder were mixed, stirred, washed for 3 times, separated, and sent to an oven for drying at 102° C. for 1h3 min. After ball-milling, they were sent to the sintering furnace again for sintering at 550° C. for 6h37 min, and 4.3 g of rod-shaped sodium-ion positive electrode material Na(Fe$_{0.98}$Zn$_{0.02}$)PO$_4$/CNF-0.035C—Na was obtained.

Figure 2:
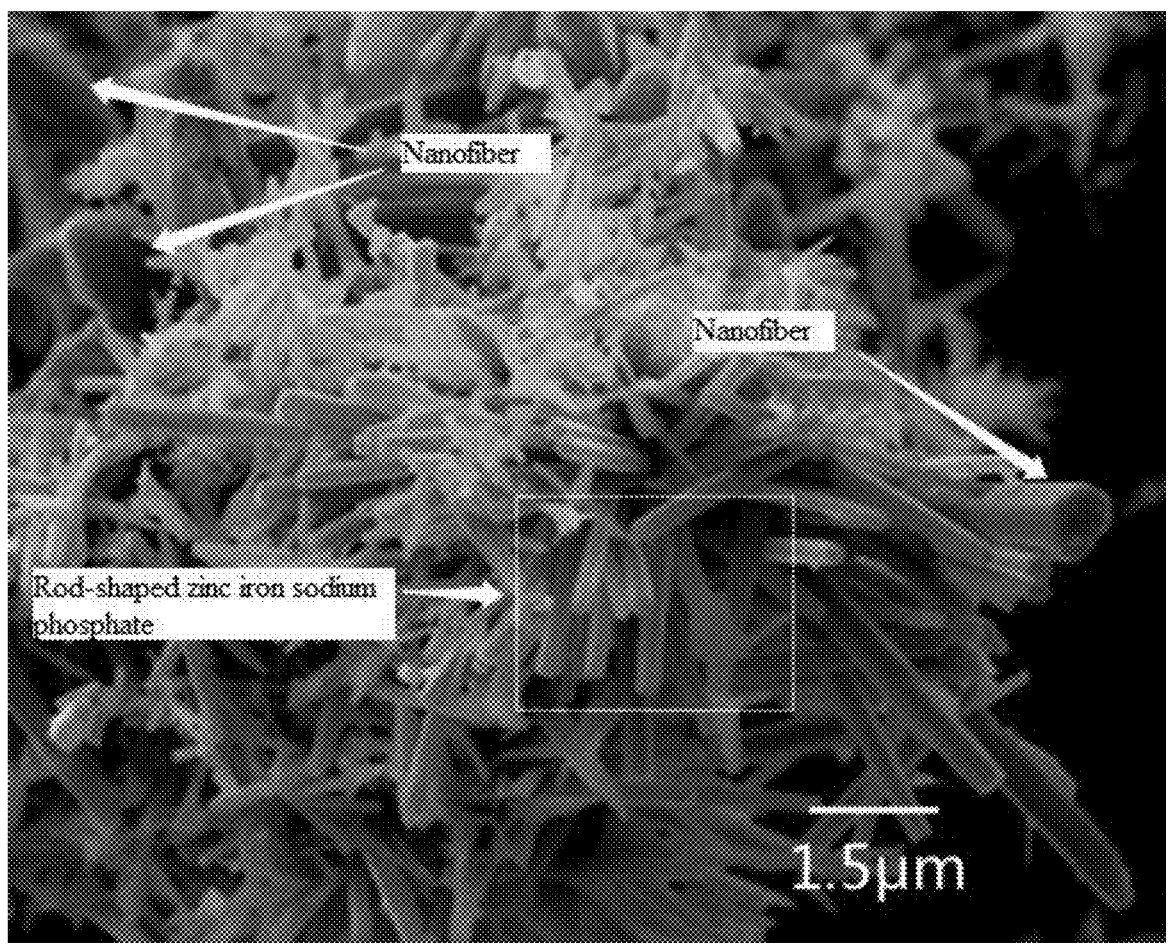
FIG. 2 shows the SEM image of the rod-shaped sodium-ion positive electrode material $Na(Fe_{0.98}Zn_{0.02})PO_4/CNF$-0.035C—Na prepared in Example 3 of the present disclosure.

FIG. 2 shows the rod-shaped sodium-ion positive electrode material Na(Fe$_{0.98}$Zn$_{0.02}$)PO$_4$/CNF-0.035C—Na prepared in this example, which was composed of a rod-shaped sodium-ion positive electrode material base material and nanofiber interspersed in the sodium-ion positive electrode material base material. The cross-sectional diameter of the sodium-ion positive electrode material base material was between 0.3-0.5 μm, and the cross-sectional diameter of the nanofiber was between 0.5-1 μm, which was a large diameter, and the larger nanofiber can adjust the ratio of large and small rod-shaped materials.

Example 4

In this example, a rod-shaped sodium-ion positive electrode material is prepared, and the specific process is as follows:
(1) 90 mL of 0.69 mol/L phosphoric acid, 86.6 mL of 0.52 mol/L ferrous chloride, 50.0 mL of 1.0 mol/L sodium hydroxide, 4.6 mL of 0.55 mol/L zinc acetate, and 7.8 mL of 0.32 mol/L nickel sulfate were added to a beaker. During stirring in a stirrer for 1h43 min, 0.5 g of cetyltrimethylammonium bromide was added, and acetic acid was added to control the pH to 7.2. After standing for 6h25 min, 10 mL of nanofiber dispersion loaded with 5.1% sodium benzoate (The nanofiber fiber paper was carbon nanofiber paper, purchased from a material company in Zhejiang. The diameter of the nanofiber of the nanofiber paper was between 0.5-3 μm; 5 g of nanofiber paper was soaked in 50 ml of a mixed solution of 0.02 mol/L hydrochloric acid and 0.33 mol/L sodium phosphate; and the mixture was stirred, and subjected to sensitization treatment. Then the nanofiber paper was washed and peeled off to obtain 3.7 g of nanofiber; and the nanofiber was mixed with 0.19 g of sodium benzoate, ball-milled, sent to a sintering furnace under Ar atmosphere to heat at 580° C., and subjected to loading treatment to obtain C—Na-loaded nanofiber. Finally, the C—Na-loaded nanofiber was dispersed in 70 ml of ethylene glycol solution to obtain 5.1% C—Na-loaded nanofiber dispersion) was added, stirred in a stirrer for 6h36 min, sent to an oven with Ar gas added for anti-oxidation treatment, and dried at 90° C. for 3h41 min to obtain a material to be sintered;
(2) 5 g of the material to be sintered was put into a temperature-resistant ceramic crucible and sent to a sintering furnace filled with Ne gas for sintering at 225° C. for 2h2 min. The primary sintered black powder was taken out. Sodium acetate and alcohol were mixed at 1:1 to prepare a detergent. 25 mL of detergent and primary sintered black powder were mixed, stirred, washed for 3 times, separated, and sent to an oven for drying at 110° C. for 1h3 min. After ball-milling, they were sent to the sintering furnace again for sintering at 610° C. for 6h52 min. After ball-milling, 4.3 g of rod-shaped sodium-ion positive electrode material Na(Fe$_{0.9}$Zn$_{0.05}$Ni$_{0.05}$)PO$_4$/CNF-0.051C—Na was obtained.

Example 5

In this example, a rod-shaped sodium-ion positive electrode material is prepared, and the specific process is as follows:
(1) 90 mL of 0.69 mol/L phosphoric acid, 86.6 mL of 0.52 mol/L ferrous chloride, 50.0 mL of 1.0 mol/L sodium hydroxide, 2.7 mL of 0.55 mol/L zinc acetate, 7.8 mL of 0.32 mol/L nickel sulfate, and 1.3 mL of 0.76 mol/L cobalt chloride were added to a beaker. During stirring in a stirrer for 1h43 min, 0.6 g of cetyltrimethylammonium bromide was added, and acetic acid was added to control the pH to 7.1. After standing for 6h25 min, 15 mL of nanofiber dispersion loaded with 5.1% sodium benzoate (The nanofiber fiber paper was carbon nanofiber paper, purchased from a material company in Zhejiang. The diameter of the nanofiber of the nanofiber paper was between 0.5-3 μm; 5 g of nanofiber paper was soaked in 50 ml of a mixed solution of 0.02 mol/L hydrochloric acid and 0.33 mol/L sodium phosphate; and the mixture was stirred, and subjected to sensitization treatment. Then the nanofiber paper was washed and peeled off to obtain 3.7 g of nanofiber; and the nanofiber was mixed with 0.19 g of sodium benzoate, ball-milled, sent to a sintering furnace under Ar atmosphere to heat at 580° C., and subjected to loading treatment to obtain C—Na-loaded nanofiber. Finally, the C—Na-loaded nanofiber was dispersed in 70 ml of ethylene glycol solution to obtain 5.1% C—Na-loaded nanofiber dispersion) was added, stirred in a stirrer for 6h36 min, sent to an oven with Ar gas added for anti-oxidation treatment, and dried at 90° C. for 3h41 min to obtain a material to be sintered;
(2) 5 g of the material to be sintered was put into a temperature-resistant ceramic crucible and sent to a sintering furnace filled with Ne gas for sintering at 225° C. for 2h2 min. The primary sintered black powder was taken out. Sodium acetate and alcohol were mixed at 1:1 to prepare a detergent. 5 mL of detergent and primary sintered black powder were mixed, stirred, washed for 3 times, separated, and sent to an oven for drying at 110° C. for 1h3 min. After ball-milling, they were sent to the sintering furnace again for sintering at 610° C. for 6h52 min. After ball-milling, 4.5 g of rod-shaped sodium-ion positive electrode material Na(Fe$_{0.9}$Ni$_{0.05}$Zn$_{0.03}$Co$_{0.02}$)PO$_4$/CNF-0.051C—Na was obtained.

Example 6

In this example, a rod-shaped sodium-ion positive electrode material is prepared, and the specific process is as follows:
(1) 90 mL of 0.69 mol/L phosphoric acid, 82.7 mL of 0.52 mol/L ferrous chloride, 50.0 mL of 1.0 mol/L sodium hydroxide, 2.7 mL of 0.55 mol/L zinc acetate, 14.1 mL of 0.32 mol/L nickel sulfate, and 1.3 mL of 0.76 mol/L cobalt chloride were added to a beaker. During stirring in a stirrer for 1h43 min, 0.5 g of cetyltrimethylammonium bromide was added, and acetic acid was added to control the pH to 7.1. After standing for 6h25 min, 20 mL of nanofiber dispersion loaded with 5.1% sodium benzoate (The nanofiber fiber paper was carbon nanofiber paper, purchased from a material company in Zhejiang. The diameter of the nanofiber of the nanofiber paper was between 0.5-3 μm; 5 g of nanofiber paper was soaked in 50 ml of a mixed solution of 0.02 mol/L hydrochloric acid and 0.33 mol/L sodium phosphate; and the mixture was stirred, and subjected to sensitization treatment. Then the nanofiber paper was washed and peeled off to obtain 3.7 g of nanofiber; and the nanofiber was mixed with 0.19 g of sodium benzoate, ball-milled, sent to a sintering furnace under Ar atmosphere to heat at 580° C., and subjected to loading treatment to obtain C—Na-loaded nanofiber. Finally, the C—Na-loaded nanofiber was dispersed in 70 ml of ethylene glycol solution to obtain 5.1% C—Na-loaded nanofiber dispersion) was added, stirred in a stirrer for 6h36 min, sent to an oven with Ar gas added for anti-oxidation treatment, and dried at 90° C. for 3h41 min to obtain a material to be sintered;

(2) 5 g of the material to be sintered was put into a temperature-resistant ceramic crucible and sent to a sintering furnace filled with Ne gas for sintering at 225° C. for 2h2 min. The primary sintered black powder was taken out. Sodium acetate and alcohol were mixed at 1:1 to prepare a detergent. 5 mL of detergent and primary sintered black powder were mixed, stirred, washed for 3 times, separated, and sent to an oven for drying at 110° C. for 1h3 min. After ball-milling, they were sent to the sintering furnace again for sintering at 610° C. for 6h52 min. After ball-milling, 4.4 g of rod-shaped sodium-ion positive electrode material $Na(Fe_{0.86}Ni_{0.09}Zn_{0.03}\ Co_{0.02})PO_4/CNF\text{-}0.051C\text{—}Na$ was obtained.

Comparative Example 1 (without Adding Nanofiber)

In this comparative example, a rod-shaped sodium-ion positive electrode material is prepared, and the specific process is as follows:

(1) 120 mL of 0.53 mol/L ammonium dihydrogen phosphate, 91.4 mL of 0.52 mol/L ferrous chloride, 59.5 mL of 0.84 mol/L sodium acetate, and 3.4 mL of 0.74 mol/L nickel chloride were added to a beaker. During stirring in a stirrer for 1h43 min, 0.4 g of dodecyltrimethylammonium chloride was added, and acetic acid was added to control the pH to 7.1. After standing for 6h17 min, they were stirred in a stirrer for 6h16 min, sent to an oven with Ar gas added for anti-oxidation treatment, and dried at 80° C. for 4h7 min to obtain a material to be sintered;

(2) 5 g of the material to be sintered was put into a temperature-resistant ceramic crucible and sent to a sintering furnace filled with Ar gas for sintering at 185° C. for 2h7 min. The primary sintered black powder was taken out. Sodium acetate and alcohol were mixed at 1:1 to prepare a detergent. 25 mL of detergent and primary sintered black powder were mixed, stirred, washed 3 times, separated, and sent to an oven for drying at 102° C. for 1h3 min. After ball-milling, they were sent to the sintering furnace again for sintering at 550° C. for 6h37 min. After ball-milling, 4.2 g of rod-shaped sodium-ion positive electrode material $Na(Fe_{0.95}Ni_{0.05})PO_4$ was obtained.

Comparative Example 2 (without Adding Regulator or Nanofiber)

In this comparative example, a sodium-ion positive electrode material was prepared, and the specific process was as follows:

(1) 90 mL of 0.69 mol/L phosphoric acid, 86.6 mL of 0.52 mol/L ferrous chloride, 50.0 mL of 1.0 mol/L sodium hydroxide, 4.6 mL of 0.55 mol/L zinc acetate, and 7.8 mL of 0.32 mol/L nickel sulfate were added to a beaker. During stirring in a stirrer for 1h43 min, they were stirred in a stirrer for 6h36 min, sent to an oven with Ar gas added for anti-oxidation treatment, and dried at 90° C. for 3h41 min to obtain a material to be sintered;

(2) 5 g of the material to be sintered was put into a temperature-resistant ceramic crucible and sent to a sintering furnace filled with Ne gas for sintering at 225° C. for 2h2 min. The primary sintered black powder was taken out. Sodium acetate and alcohol were mixed at 1:1 to prepare a detergent. 25 mL of detergent and primary sintered black powder were mixed, stirred, washed for 3 times, separated, and sent to an oven for drying at 110° C. for 1h3 min. After ball-milling, they were sent to the sintering furnace again for sintering at 610° C. for 6h52 min. After ball-milling, 4.3 g of sodium-ion positive electrode material $Na(Fe_{0.9}Zn_{0.05}Ni_{0.05})PO_4$ was obtained.

Battery Assembly (1) Preparation of Electrode Sheet 0.10 g of each of the sodium-ion positive electrode materials prepared in Examples 1-6 and Comparative Examples 1-2 and the corresponding 0.015 g of Superb conductive carbon black were put into a mortar, and the active material and conductive carbon black were ground in the mortar for 16 min, followed by adding 0.15 g of NMP for wet milling for 10 min, and finally 0.015 g of PVDF for rapid milling. The black paste-like substance was uniformly coated on aluminum foil, rolled for molding, and dried in a 90° C. oven for 10 h overnight to obtain an electrode sheet. Then, the sheet was cut into discs with a diameter of 0.8 cm by a microtome, and the mass and the setting parameters of the active material in the discs were calculated.

(2) Battery Assembly

The electrochemical performance of the material was tested by assembling a CR3202 button battery. In a glove box filled with Ar gas, the negative electrode shell, spring sheet, gasket, positive electrode material, and electrolyte (16.8 g $NaPF_6$ was added to 50 ml of mixed solution, which was prepared by mixing EC, DMC and DEC at 1:1:1), separator (polypropylene film), electrolyte, sodium sheet, positive electrode shell were put into the button battery in sequence, and sealed to complete the assembly of the button battery. Among them, the metal sodium sheet was used as the counter electrode material, and glass fiber paper was used as the separator. The test was carried out at 25° C., a voltage of 2.5-4.0 V and 1C rate. The battery performance test results are shown in Table 1.

TABLE 1

| Battery sample | Discharge specific capacity (mAh/g) | | | Coulombic efficiency (%) | | | BET ($m^2/g$) |
| --- | --- | --- | --- | --- | --- | --- | --- |
| | $1^{st}$ | $20^{th}$ | $50^{th}$ | $1^{st}$ | $20^{th}$ | $50^{th}$ | |
| Example 1 | 114.3 | 111.8 | 107.5 | 89.4 | 94.9 | 98.4 | 0.47 |
| Example 2 | 115.1 | 112.6 | 108.7 | 90.5 | 93.8 | 97.8 | 0.46 |
| Example 3 | 114.7 | 111.2 | 107.3 | 89.7 | 93.0 | 97.3 | 0.47 |
| Example 4 | 114.0 | 111.7 | 108.2 | 88.5 | 93.9 | 98.4 | 0.46 |
| Example 5 | 115.1 | 111.9 | 109.4 | 90.5 | 93.7 | 98.8 | 0.48 |
| Example 6 | 116.7 | 112.3 | 108.6 | 89.9 | 93.4 | 97.7 | 0.48 |
| Comparative Example 1 | 108.3 | 104.1 | 102.4 | 86.3 | 91.8 | 96.2 | 0.42 |
| Comparative Example 2 | 107.9 | 103.4 | 101.3 | 87.2 | 92.3 | 96.5 | 0.44 |

It can be seen from Table 1 that the electrochemical performance of Comparative Example 1 and Comparative Example 2 was significantly lower than that of the Examples, because Comparative Example 1 was only composed of a single rod-shaped nanostructure, which cannot well alleviate the stress and volume change generated during the intercalation and deintercalation of sodium ions, resulting in poor cycle performance and specific capacity. Comparative Example 2 was a common doped sodium-ion positive electrode material without morphology change, so its electrochemical performance was poor.

The embodiments of the present disclosure have been described in detail above in conjunction with the drawings. However, the present disclosure is not limited to the above-mentioned embodiments, and various modifications can be made without departing from the purpose of the present disclosure within the scope of knowledge possessed by those of ordinary skill in the art. In addition, in the case of no conflict, the embodiments of the present disclosure and the features in the embodiments may be combined with each other

The invention claimed is:

1. A rod-shaped sodium-ion positive electrode material, comprising rod-shaped base material and nanofiber interspersed in the base material, the nanofiber is loaded with C—Na, and the rod-shaped sodium-ion positive electrode material has a general chemical formula of $Na(Fe_aT_b)PO_4$/CNF-c(C—Na), wherein T is at least one of Ni, Co, Zn, Mn, Fe, V, Ti and Mo, $0.9 \leq a < 1$, $0 < b \leq 0.2$, $0.001 \leq c \leq 0.1$.

2. The rod-shaped sodium-ion positive electrode material according to claim 1, wherein a mass ratio of the base material to the nanofiber is 20:(0.02-1); a cross-sectional diameter ratio of the nanofiber to the base material is 1:(0.5-5).

3. The rod-shaped sodium-ion positive electrode material according to claim 1, wherein a loading of the C—Na is 0.1-10% of a mass of the nanofiber.

4. A preparation method of the rod-shaped sodium-ion positive electrode material according to claim 1, comprising steps of:
   S1: mixing phosphoric acid source, iron source, sodium source, T source, a regulator and C—Na-loaded nanofiber dispersion, and drying under an inert atmosphere to obtain a material to be sintered; and
   S2: first sintering the material to be sintered at a low temperature under an inert atmosphere to decompose the regulator to obtain a primary calcined powder, and washing, drying, ball-milling, and then sintering the primary calcined powder at a high temperature to obtain the rod-shaped sodium-ion positive electrode material.

5. The preparation method according to claim 4, wherein in step S1, the phosphoric acid source is at least one of ammonium phosphate, ammonium hydrogen phosphate, phosphoric acid, sodium phosphate and sodium hydrogen phosphate.

6. The preparation method according to claim 4, wherein in step S1, the iron source is at least one of ferrous sulfate, ferrous nitrate, ferrous chloride and ferrous bromide.

7. The preparation method according to claim 4, wherein in step S1, the regulator is at least one of dodecyltrimethylammonium chloride, dodecyltrimethylammonium bromide, tetradecyltrimethylammonium chloride, tetradecyltrimethylammonium bromide, cetyltrimethylammonium chloride, cetyltrimethylammonium bromide, octadecyltrimethylammonium chloride and octadecyltrimethylammonium bromide.

8. The preparation method according to claim 4, wherein in step S1, the C—Na-loaded nanofiber dispersion is prepared as follows: soaking nanofiber paper in a mixed solution of acid and sodium salt, performing sensitization treatment, then washing the nanofiber paper, and peeling off to obtain nanofiber; mixing the nanofiber with organic sodium salt, ball-milling, heating under an inert atmosphere, and performing loading treatment to obtain C—Na-loaded nanofiber; and then dispersing the C—Na-loaded nanofiber in an ethylene glycol solution to obtain the C—Na-loaded nanofiber dispersion.

9. The preparation method according to claim 4, wherein in step S2, a temperature of the sintering at low temperature is 100-300° C.; and a temperature of the sintering at high temperature is 300-800° C.

10. Use of the rod-shaped sodium-ion positive electrode material according to claim 1 in a sodium-ion battery.

* * * * *